US009356985B2

(12) United States Patent
Burckart et al.

(10) Patent No.: US 9,356,985 B2
(45) Date of Patent: May 31, 2016

(54) STREAMING VIDEO TO CELLULAR PHONES

(71) Applicant: International Business Machines Corporation, Armonk, NY (US)

(72) Inventors: Erik J. Burckart, Raleigh, NC (US); Robert Madey, Jr., Spicwood, TX (US); Victor S. Moore, Lake City, FL (US); Richard Poundstone, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/474,219

(22) Filed: Sep. 1, 2014

(65) Prior Publication Data

US 2015/0058937 A1    Feb. 26, 2015

Related U.S. Application Data

(63) Continuation of application No. 13/173,030, filed on Jun. 30, 2011, now Pat. No. 8,824,676.

(51) Int. Cl.
*H04L 29/06* (2006.01)
*H04N 21/222* (2011.01)
*H04N 21/414* (2011.01)
*H04N 21/61* (2011.01)
*H04N 21/643* (2011.01)
(Continued)

(52) U.S. Cl.
CPC ........ *H04L 65/601* (2013.01); *G06F 17/30837* (2013.01); *H04L 61/2007* (2013.01); *H04L 63/10* (2013.01); *H04L 65/4084* (2013.01); *H04L 67/06* (2013.01); *H04L 67/1095* (2013.01); *H04N 21/222* (2013.01); *H04N 21/41407* (2013.01); *H04N 21/6131* (2013.01); *H04N 21/64322* (2013.01); *H04N 21/8456* (2013.01); *H04W 4/18* (2013.01); *H04L 61/1511* (2013.01); *H04L 69/04* (2013.01); *H04W 88/182* (2013.01)

(58) Field of Classification Search
CPC ............ H04L 29/00; G06F 3/00; G06T 9/00; H04N 7/00; H04N 19/00; H04N 21/00
See application file for complete search history.

(56) References Cited

U.S. PATENT DOCUMENTS

2008/0046616 A1* 2/2008 Verzunov et al. ............... 710/68
2010/0315435 A1* 12/2010 Ishida et al. ................ 345/634
(Continued)

FOREIGN PATENT DOCUMENTS

WO    WO2011/054377    5/2011

OTHER PUBLICATIONS

Kim, et al., "The Two-Tiered Proxy System for Seamless Multimedia Service in a Mobile Computing Environment," Kyungpook Natl. Univ., Jan. 2004.

*Primary Examiner* — Joseph P Hirl
*Assistant Examiner* — Leynna Truvan
(74) *Attorney, Agent, or Firm* — Steven M. Greenberg, Esq.; CRGO Law

(57) ABSTRACT

A method, system, and computer program product for deploying data to a web server for streaming video to a mobile device. The method can include receiving a request for streaming video from a mobile device upon the resolving of the request by a DNS. The method can further include simultaneously sending both a request to a database for the video requested and a playlist for the video to the mobile device. The method can then include receiving the video from the database. The video received is sent as a sequence of blocks, where each block can further be comprised of a sequence of chunks. The method can even further include decompressing each block and storing each chunk on a web server. The method can further include an exchange of a security credential.

17 Claims, 3 Drawing Sheets

(51) Int. Cl.
*H04N 21/845* (2011.01)
*H04W 4/18* (2009.01)
*G06F 17/30* (2006.01)
*H04L 29/08* (2006.01)
*H04L 29/12* (2006.01)
*H04W 88/18* (2009.01)

(56) References Cited

U.S. PATENT DOCUMENTS

2011/0082924 A1 4/2011 Gopalakrishnan
2012/0002717 A1 1/2012 Ma et al.

* cited by examiner

STREAMING VIDEO TO CELLULAR PHONES

CROSS-REFERENCE TO RELATED APPLICATION

This application is a Continuation of U.S. application Ser. No. 13/173,030, filed Jun. 30, 2011, now U.S. Pat. No. 8,824,676, which is incorporated herein by reference in its entirety.

BACKGROUND OF THE INVENTION

1. Field of the Invention

The present invention relates to data deployment and more particularly to data deployment for video streaming to mobile devices.

2. Description of the Related Art

The advent of the Internet has enabled new modes of distributing electronic media including video. Whereas in the past, people had been satisfied to receive portable media for insertion into a playback device such as a video cassette player, compact disc player, digital versatile disc player in playing back media such as audio, video or both, the modern era has created an on-demand society in which people prefer immediate gratification in the retrieval of video without delay upon selection by the end user. Further, no longer is the end user content only to replay media on a fixed end user device such as a television set or personal computer. Rather, at present end users play back media on a multitude of mobile devices including cellular phones.

Hypertext transfer protocol (HTTP) Live Streaming (HLS or HTTPLS) is an HTTP-based media streaming communications protocol intended upon delivering media to mobile devices, where HTTP is a networking protocol for distributed, collaborative, and hypermedia information systems. In delivering media to a mobile device, HLS works by breaking the overall stream into a sequence of small HTTP-based file downloads, where each download can load one short part. Links to these parts are added to a playlist in the same time order that they appear in a video. Since HLS requests use only standard HTTP transaction, HLS is capable of traversing any firewall or proxy server that lets through standard HTTP traffic.

Streaming by way of HLS can be deployed at the edges of a wireless network as no special video delivery services other than a web browser is required, but the video must be deployed to the web server on the edge of a network in advance. Also, as a mobile client moves among wireless cell sites in a cellular system, this movement must remain transparent to the user. To do so each cell site has its own web server and domain name system (DNS) for delivering HLS and each is assigned the same internal IP address. When a mobile client moves to another cell site while playing a video, no interruption occurs on the mobile client, because the request gets resolved to that local web sever, which also has the video on hand. In this way, the video is stored on a local server and a local web server, which requires a large amount of storage. In addition, the transparency only includes the cell sites that have the playing video. In other words, if the mobile client moves to a cell site that does not have the playing video, the playing movie may be interpreted as the current cell site retrieves the video.

As an alternative, streaming can be done further back in the network where the IP connections from many cell sites are aggregated. But this can add latency to the network as well as can clog the network as each chunk of video is fetched individually. In addition, playlist updates must be checked for and retrieved when necessary, which can add to network traffic.

BRIEF SUMMARY OF THE INVENTION

Embodiments of the present invention address deficiencies of the art in respect to deploying data and provide a novel and non-obvious method, system, and computer program product for deploying data to a web server for streaming video to a mobile device. In an embodiment of the invention, a method for deploying data to a web server is provided and can include receiving a request for streaming video from a mobile device upon the resolving of the request by a DNS. The method can further include approximately simultaneously sending both a request to a database for the video requested and a playlist for the video to the mobile device. The method can even further including receiving the video from the database in response to the request. The video received is sent as a sequence of blocks, where each block can further be comprised of a sequence of chunks. The method can yet even further include decompressing each block and storing each chunk on a web server. The method can also include an exchange of a security credential.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the deployment of data to a web server for streaming video on a mobile device on the edge of a wireless network. In accordance with an embodiment of the invention, a web server at the edge of a network can receive a request to provide a video to a mobile web client after a domain name system (DNS) in the cell site where the mobile web client is located resolves a video request received from the mobile web client. Of note, the "edge" is a server at a cell or radio tower or, more generally, a server close to the mobile web client requesting and receiving data. The web server can then send a playlist to the mobile web client while at the same time requesting the video itself from a database within the network. Of note, the video can be sent to the web server as a sequence of blocks, where each block contains a sequence of chunks. In this way, the "chattiness" across the network can be held to a minimum as the web server does not need to fetch each chunk individually. The video blocks received can then be decompressed and the chunks saved. In this way, video streaming including attributes from HLS and HTTP progressive streaming.

Of note, the chunks remain on the web server along with chunks of other videos until space is needed for a newly requested video. If storage space is required, chunks can first be deleted from the end of a video for storage optimization. In this way, the beginning of the video is preserved in case it is required again. In addition, the beginning chunks of a video can be pre-deployed with a playlist to allow the web server more time to fetch the remaining parts of the movie. This can also allow for an increased number of videos cached on the edge of the network without having to store the entire video.

Upon the decompression of the video blocks, the mobile web client can fetch then play each chunk according the links in the previously received playlist. If the mobile web client moves into a region of another cell tower, the web server in the new region knows that it does not have the chunk requested. The new web server can request the needed chunks from a database within its network. In this way, a video can be deployed to the edge of a network without consuming significant storage resources required to save the entire video and without the burden to the network of serving many chunks from inside the network to its edges. In addition, as a mobile web client wanders throughout a wireless network, each mobile web client can exchange its security credentials with any server encountered as proof that the mobile web client has permission to use that particular server.

Figure 1:
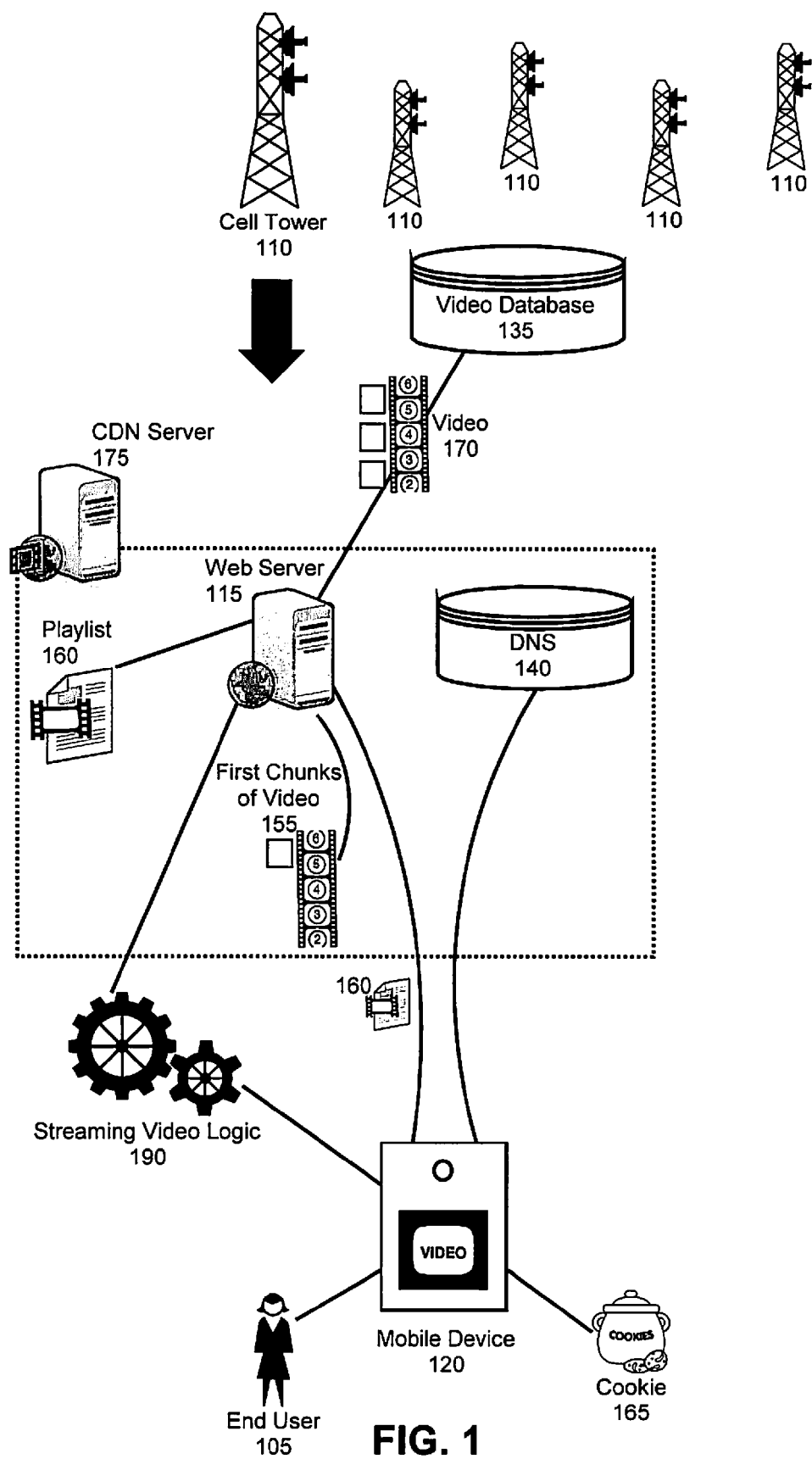
FIG. 1 is a pictorial illustration of a process for deploying data to a web server for streaming video to a mobile device on the edge of a wireless network.

In further illustration, FIG. 1 pictorially shows a process for deploying data to a web server for streaming video to a mobile device on the edge of a wireless network. As shown in FIG. 1, an end user 105 from a mobile device 120 at the edge of a wireless network can request a video be played on her mobile device 120. The request for the video can be sent to a DNS 140 in the area associated with a cell tower 110 for where the mobile device 120 is located. The DNS 140 can resolve the request to the local web server 115. Of note, the DNS 140 and the web server 115 along with additional components (not pictured) can be part of a content delivery network (CDN) server 175. Thereafter, streaming video logic 190 on the web server 115 can approximately simultaneously return a playlist 160 for the video to the mobile client 120 and request the video 170 itself from a video database 135. Of note, the video database 135 is located within the same network as the web server 115. Of further note, the playlist 160 can first be stored on the web server 115 before being sent to the mobile client 120, and the playlist 160 can identify a sequence of links corresponding to the chunks of the video requested. The playlist 160 can also contain metadata for the various sub-streams available; the mobile client 120 may select from a number of different alternate streams containing the same material encoded at a variety of data rates, allowing the streaming session to adapt to the available data rate.

The video 170 from the video database 135 can be sent to the web server 115 as a sequence of blocks, where each block contains a sequence of chunks. In this way, network "chattiness" is reduced as the video 170 is returned in sequences of blocks as opposed to individual chunks. Upon receiving the blocks of the video 170, streaming video logic 190 on the web server 115 can decompress the blocks and store the chunks. Of note, the chunks remain on the web server 115 along with chunks of other videos previously received until space is needed for a newly requested movie.

Upon the web server 115 receiving and storing some chunks of the video 170, streaming video logic 190 on the mobile device 120 can sequentially fetch and play each link in the playlist 160. The process of fetching and displaying each chunk associated with a link can progress sequentially until all of the parts are played. To prevent breaks in the playing, the next chunk in the video is fetched while the current one is being viewed. Of note, a portion of the beginning of a video or the first few chunks of a video 155 can be pre-deployed along with the playlist 160 to the mobile device 120. In this way, streaming video logic 190 on the web server 115 can have more time to fetch the remaining parts of the video. Of further note, the first few chunks of the video 155 along with the playlist 160 can be stored on the web server 115.

Further, if the mobile device 120 moves into range of a different cell tower, streaming video logic 190 of a new web server, in the new area, can know it does not have the chunk being requested from the mobile device 120; therefore, it can request the needed chunks from a new video database within the new network. (For simplicity in the figure, the new web server, the new video database, and the new cell tower are not pictured. In addition, streaming video logic 190 can be executing on any web server on any cell tower.) Of note, as the mobile device 120 moves through different wireless networks, the mobile device 120 can provide any server encountered with a cookie 165 as proof of its permission to use that server. The cookie 165 can contain both a time and location stamp.

Figure 2:
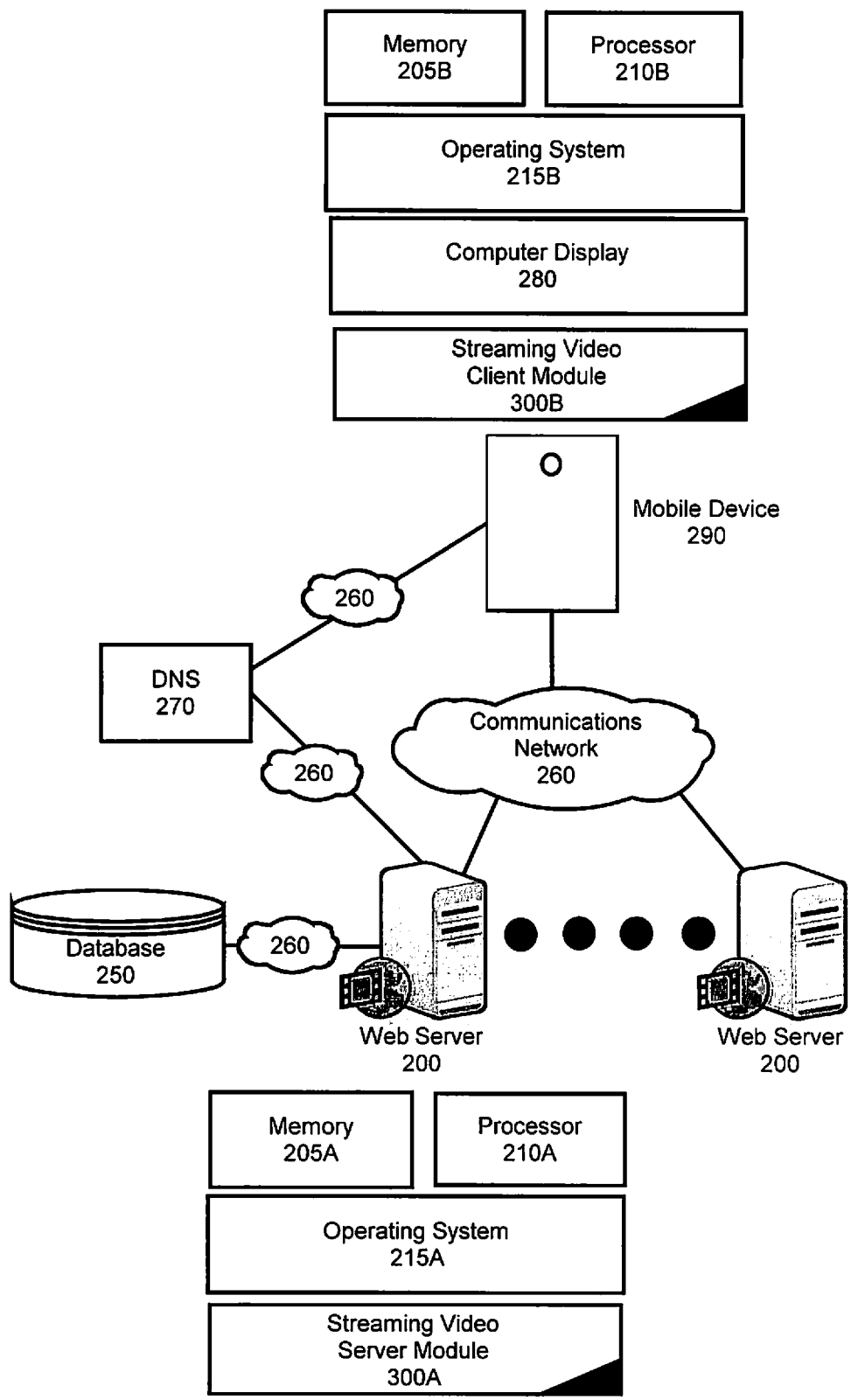
FIG. 2 is a schematic illustration of a data processing system configured for streaming a video to a mobile device on the edge of a network; and, FIG. 3 is a flow chart illustrating a process for streaming video from a server to a mobile client.

The process described in connection with FIG. 1 can be implemented in a system as shown in FIG. 2. In further illustration, FIG. 2 schematically shows a data processing system configured for streaming a video to a mobile device on the edge of a network. The streaming video system can include at least one web server 200. Each web server 200 can be coupled to a DNS 270, a database 250, and a mobile device 290. The database 250 can support content storage, including video storage. The web server 200 can communicate with the database 250, DNS 270, and mobile device 290 via a communications network 260. The communications network 260 is not limited to a specific communications technique and can include Internet, wireless communications, Ethernet, 3G, and 4G. Each web server 200 can include at least one processor 210A and memory 205A supporting the execution of an operating system (O/S) 215A. The O/S 215A in turn can support a streaming video server module 300A. Note, for simplicity, only one DNS 270, database 250, and mobile device 290 is shown, but multiple of these components can be present in the system. In addition, only memory 205A, processor 210A, O/S 215A, streaming video server module 300A is shown for one web server 200, but each web server 200 in the system can have these components.

The streaming video server module 300A, which can execute in memory 205A of the web server 200, can include program code which, when executed, can send a playlist to a mobile device 290 while approximately simultaneously sending a request to a database 250 within the network for a video in response to a DNS resolving a video request on a mobile device 290 by an end user. The video itself can be sent to the web server 200 as a sequence of blocks, where each block contains a sequence of chunks. Upon receiving a sequence of blocks, the streaming video server module 300A on the web server 200 can decompress the blocks and store the chunks on the web server 200. Of note, the chunks can stay on the web server 200 until space is needed for a newly requested video.

Of note, streaming video server module 300A can recover space on the web server 200 by deleting video chunks beginning from the end of a previously played video first. In this way, the beginning of the video can be preserved in case it is required again. Also, when recovering space on the web server 200 at least the first few chunks of a previously played video can be kept. In this way, the first few chunks of the video can be pre-deployed with the playlist allowing the web server 200 more time to fetch the remaining parts of the video. Of further note, the first few chunks of the video along with the playlist can be stored on the web server 200.

Upon the chunks being stored on the web server 200, the streaming video client module 300B on the mobile device 290 can include program code, which when executed by at least one processor 210B, can fetch chunks according to the links in the video playlist. The mobile device 290 can further include memory 205B supporting the execution of an O/S 215B. The O/S 215B in turn can support a computer display 280 and the streaming video client module 300B. The mobile device 290 can be coupled to a DNS 270 and a web server 200. The mobile device 290 can communicate with the DNS 270 and the web server 200 via a communications network 260. The communications network 260 is not limited to a specific communications technique and can include Internet, wireless communications, Ethernet, 3G, and 4G. Upon the streaming video client module 300B fetching the chunks, the module 300B can display the chunks on the computer display 280. In this way, an end user views a streaming video on the mobile device 290.

Of note, if the mobile device 290 moves to a new area covered by a different cell site, a different streaming video server module on a different web server recognizes that it does not have the chunk requested. The new streaming video server module on the new web server can then request the needed video chunks from a new database within the new network. As before, the requested video can be returned to the new web server in the form of compressed blocks that will need to be uncompressed and stored.

Of further note, as the mobile device 290 moves throughout the network, security credentials can be exchanged with each new server encountered. This can be accomplished by saving the security credentials of a mobile device 290 as a cookie. The security credentials can serve as proof of the permission that the mobile device 290 has to use the server. Of even further note, the cookie can include both time and location information. In this way, a cookie can expire, thus, forcing the client to certify itself anew if the cookie does indeed expire. In one instance, the cookie can expire when the mobile device 290 moves outside a given area or a set time limit is exceeded.

Figure 3:
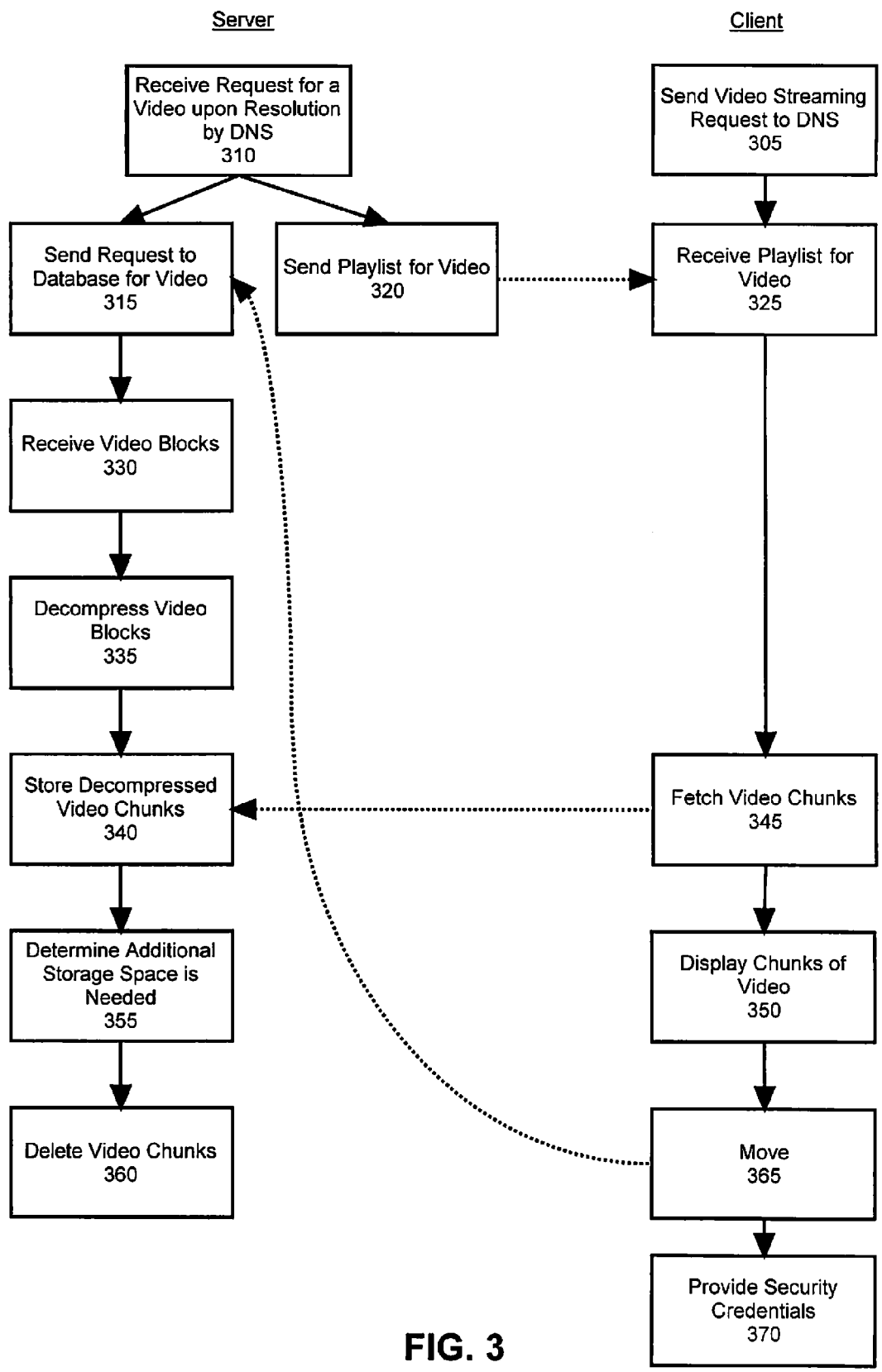

In even yet further illustration of the operation of the program code of the streaming video server module 300A and of the streaming video client module 300B, FIG. 3 is a flow chart illustrating a process for streaming video from a server to a client. Beginning in step 305, a client, for instance a mobile device client, can send a request for a video to a DNS upon an end user selecting to play a video from the client. In step 310, a server, such as a web server, can receive the video request after it gets resolved by the DNS to the server. Approximately simultaneously a request can be sent to a database requesting the video itself, as shown in step 315, and a playlist, stored on the server, can be sent to the client, as indicated in step 320. As indicated in step 325, the client can receive the playlist. Of note, along with the playlist, the client can be sent a plurality of chunks corresponding to a portion of the beginning of the requested video.

Of note, the database can be a video database where the video is stored upon content providers uploading the video. The video database can be part of a system containing different components, including but not limited to content management and an application program interface (API). The specifics mechanics of how the content providers provide video and other content to a database and how the content is deployed to a local server can be accomplished by any method now known or later developed.

In step 330, the server can receive the video blocks in response to the server sending the request to the database for the video. Of note, the video is sent as a sequence of blocks, where each block further comprises a sequence of chunks. In step 335, the received blocks can be decompressed and stored as video chunks, as indicated in step 340. As indicated in step 345, the client can fetch the video chunks stored on the server according to links in the playlist of the video and display the fetched video chunks, as shown in step 350. In this way, an end user can view the streaming video on her client as it is fetched.

Of note, the chunks are stored on the server, along with chunks of previously requested videos, until space is needed for a newly requested video. In step 355, if a determination is made that additional storage space is needed, space can be recovered by deleting video chunks, as shown in step 360. Of note, video chunks from the end of the video are deleted first. In this way, the beginning of the video is preserved in case it is required again. In addition, the first few chunks of each video can be pre-deployed with each playlist. This pre-deployment can give the server more time to fetch the remaining parts (blocks) of the video. Of note, the first few chunks of the video along with the playlist can be stored on the server.

Of further note, a client can move between cell sites, as indicated in step 365. A new server in the new cell site can realize it does not have the chunk being requested for by the client. The new server can then request the needed video blocks from a database within the network, as shown in step 315. In other words, the new server can request video from a different database corresponding to a position in the video according to the playlist. Thereafter, the new server can continue to follow the same process as outlined above.

Also, as the client travels between cell sites it can encounter different servers. Each time a new server is encountered, the client can provide its security credentials with each new server, as shown in step 370. A server can receive a security credential from the client and verify its validity. In one instance, the security credential of a client is saved as a cookie on the client. The cookie can serve as proof that the client has permission to use a particular server. The cookie can include time and location information. In this way, the cookie can expire if a client travels outside a given location or the set time limit is exceeded. A client can be forced to recertify itself when a cookie expires.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for deploying data to a web server for streaming video to a mobile device comprising:
   receiving, by a processor of the web server, a request for streaming video from a mobile device upon the resolving of the request by a domain name system (DNS);

receiving, by the processor of the web server, a security credential from the mobile device upon the mobile device encountering a server, the security credential indicating that the mobile device has permission to use the server;

sending, by the processor of the web server, a playlist identifying a sequence of links corresponding to chunks of the video requested for streaming to the mobile device while at the same time sending, by the processor of the web server, a request to a database for the video requested for streaming;

receiving, by the processor of the web server, the video requested for streaming from the database, the video requested for streaming being received as a sequence of blocks, where each block of the sequence of blocks is compressed and also further comprises a sequence of chunks;

decompressing, by the processor of the web server, each block of the received video requested for streaming;

storing, by the processor of the web server, each chunk for each decompressed block on the web server;

determining, by the processor of the web server, that storage space is needed for a newly requested video;

deleting, by the processor of the web server, at least one chunk starting from the end of a previously stored video; and, stopping, by the processor of the web server, the deletion of at least one chunk from the previously stored video when only a portion of the beginning of the previously stored video remains, so that at least a plurality of the stored chunks are preserved.

2. The method of claim 1, further comprising:
storing, by the processor of the web server, the playlist for the video requested.

3. The method of claim 1, wherein the security credential is in the form of a cookie.

4. The method of claim 1, further comprising:
requesting, by a processor of a different web server, video from a different database corresponding to a new position in the video according to the playlist, upon determining that the mobile device moved to the different web server.

5. The method of claim 1, wherein storing, by the processor of the web server, each chunk for each decompressed block on the web server, comprises storing, by the processor of the web server, a plurality of chunks corresponding to a portion of the beginning of the video requested.

6. The method of claim 1, wherein the server is the web server.

7. A data deployment system for video streaming comprising:
a server with at least one processor and memory and coupled to a domain name system (DNS);
a database coupled to the server; and,
a streaming video server module executing in memory of the server, the streaming video server module comprising program code enabled to receive a request for streaming video from a mobile device upon the resolving of the request by the DNS, to receive a security credential from the mobile device upon the mobile device encountering the server, the security credential indicating that the mobile device has permission to use the server, to send a playlist identifying a sequence of links corresponding to chunks of the video requested for streaming to the mobile device while at the same time sending a request to a database for the video requested for streaming, to receive the video requested for streaming from the database, the video requested for streaming being received as a sequence of blocks, where each block of the sequence of blocks is compressed and also further comprises a sequence of chunks, to decompress each block of the received video requested for streaming, to store each chunk for each decompressed block on the server, to determine storage space is needed for a newly requested video, to delete at least one chunk starting from the end of a previously stored video, and to stop the deletion of at least one chunk from the previously stored video when only a portion of the beginning of the previously stored video remains, so that at least a plurality of the stored chunks are preserved.

8. The system of claim 7, wherein the streaming video server module further comprises program code enabled to store the playlist for the video requested and wherein the program code to store each chunk for each decompressed block on the server comprises program code to store a plurality of chunks corresponding to a portion of the beginning of the video requested.

9. The system of claim 7, wherein the security credential is in the form of a cookie.

10. The system of claim 7, wherein the streaming video server module further comprises program code enabled to request video from a second database corresponding to a new position in the video according to the playlist, upon determining that the mobile device moved to a second server.

11. The system of claim 7, wherein the server is a web server.

12. A computer program product for deploying data to a web server for streaming video to a mobile device, the computer program product comprising:
a non-transitory computer readable storage medium having computer readable program code embodied therewith, the computer readable program code comprising:
computer readable program code for receiving a request for streaming video from a mobile device upon the resolving of the request by a domain name system (DNS);
computer readable program code for receiving a security credential from the mobile device upon the mobile device encountering a server, the security credential indicating that the mobile device has permission to use the server;
computer readable program code for sending a playlist identifying a sequence of links corresponding to chunks of the video requested for streaming to the mobile device while at the same time sending a request to a database for the video requested for streaming;
computer readable program code for receiving the video requested for streaming from the database, the video requested for streaming being received as a sequence of blocks, where each block of the sequence of blocks is compressed and also further comprises a sequence of chunks;
computer readable program code for decompressing each block of the received video requested for streaming;
computer readable program code for storing each chunk for each decompressed block on the web server;
computer readable program code for determining storage space is needed for a newly requested video;
computer readable program code for deleting at least one chunk starting from the end of a previously stored video; and,
computer readable program code for stopping the deletion of at least one chunk from the previously stored video when only a portion of the beginning of the previously stored video remains, so that at least a plurality of the stored chunks are preserved.

13. The computer program product of claim 12, wherein the computer readable program code further comprises:
computer readable program code for storing the playlist for the video requested; and,
wherein the computer readable program code for storing each chunk for each decompressed block on the web server, comprises computer readable program code for storing a plurality of chunks corresponding to a portion of the beginning of the video requested.

14. The computer program product of claim 12, wherein the computer readable program code further comprises:
computer readable program code for receiving a security credential from the mobile device upon the mobile device encountering a server, the security credential indicating that the mobile device has permission to use the server.

15. The computer program product of claim 12, wherein the security credential is in the form of a cookie.

16. The computer program product of claim 12, wherein the computer readable program code further comprises:
computer readable program code for requesting video from a different database corresponding to a new position in the video according to the playlist, upon determining that the mobile device moved to a different web server.

17. The computer program product of claim 12, wherein the server is the web server.

* * * * *